United States Patent [19]
Alelyunas et al.

[11] Patent Number: 5,528,308
[45] Date of Patent: Jun. 18, 1996

[54] DIRECT SYNTHESIS OF A DIGITAL AUDIO SAMPLE CLOCK

[75] Inventors: Carl Alelyunas, Nevada City; Michael Poimboeuf, Vacaville, both of Calif.

[73] Assignee: The Grass Valley Group, Inc., Nevada City, Calif.

[21] Appl. No.: 251,442

[22] Filed: May 31, 1994

[51] Int. Cl.$^6$ .................................................. H04N 9/475
[52] U.S. Cl. ............................ 348/512; 348/515; 348/537
[58] Field of Search ..................................... 348/194, 464, 348/512, 515, 524, 537; 327/105, 106, 107; H04N 9/475

[56] References Cited

U.S. PATENT DOCUMENTS

| | | | |
|---|---|---|---|
| 5,028,887 | 7/1991 | Gilmore | 331/18 |
| 5,281,863 | 1/1994 | Bond et al. | 327/105 |
| 5,329,253 | 7/1994 | Ichihara | 327/105 |
| 5,467,294 | 11/1995 | Hu et al. | 364/721 |

*Primary Examiner*—Victor R. Kostak
*Assistant Examiner*—R. Brian Johnson
*Attorney, Agent, or Firm*—Francis I. Gray

[57] ABSTRACT

Direct synthesis of a digital audio sample clock from a digital video sample clock is achieved by using a numerically controlled oscillator driven by the digital video sample clock. A phase accumulator increments a phase increment at the frequency of the digital video sample clock, the phase increment being a function of a desired frequency for the digital audio sample clock, the frequency of the digital video sample clock and the bit precision of the accumulator. The accumulated phase output from the accumulator is converted into a sine wave signal at the desired audio frequency from which the digital audio sample clock is derived.

4 Claims, 1 Drawing Sheet

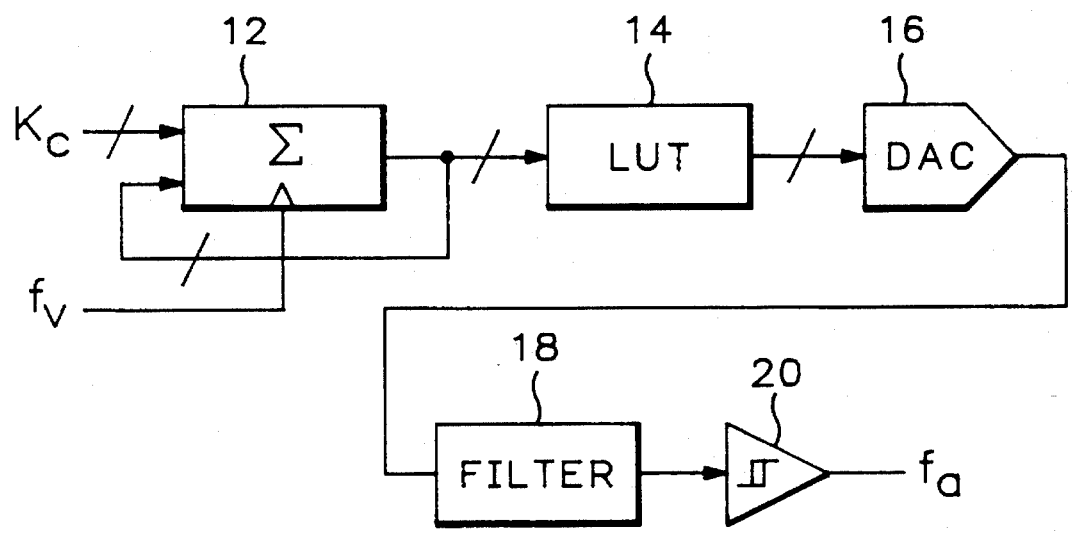

DIRECT SYNTHESIS OF A DIGITAL AUDIO SAMPLE CLOCK

BACKGROUND OF THE INVENTION

The present invention relates to digital clock synthesis, and more particularly to direct synthesis of a digital audio sample clock based upon any standard digital video sample frequency for video time scale accurate audio recording without using a phase locked loop.

There is a frequency drift between nominal audio and video reference frequencies, generally on the order of 10 to 100 parts per million (ppm), and there is an audio/video synchronization problem caused by the actual one part per thousand fractional sample rate offset of 525 line/60 Hz video relative to its nominal 60 Hz field rate, i.e., 60.0 Hz * 1000/1001 or 59.9400599400 Hz. A phase locked loop (PLL) often is used between audio and video to compensate for frequency drift between nominal reference frequencies. Any differential frequency drift causes time scale drift between the audio and video, known generally as "lip sync" error. To maintain lip-sync, audio and video time scales need to track within the order of 10 milliseconds (ms). A 100 ppm frequency drift, regardless of nominal audio sample frequency, results in a 10 ms time scale drift within only 100 seconds.

As described in co-pending U.S. patent application Ser. No. 08/096,356 filed Jul. 23, 1993 by Michael Poimboeuf et al entitled "Synchronization of Digital Audio with Digital Video" incorporated herein by reference, there are a fractional number of 32 KHz, 44.1 KHz or 48 KHz audio samples, i.e., 533.867, 735.735 and 800.8 respectively, in the time span of one 525/60 video field. The smallest number of video fields which contain an integer number of audio samples for these rates, or minimum field denominator (mfd), are 15 (8008 samples), 200 (147147 samples) and 5 (4004) respectively. These minimum number of samples represent the minimum sample quotient (msq) for each respective field denominator. These ratios make N to M matching, where N and M are any integers, between audio and video sampling frequencies difficult to accomplish.

Prior techniques have used the following methods:

1. Reducing the sample rate by one part per thousand, phase locking that audio sample rate to the 525/60 video sample frequency, rounding up the published rate by not publishing enough significant digits to show error, and calling that rate "synchronized to video" so that 44.056 . . . KHz becomes 44.1 KHz and 47.952 . . . KHz becomes 48 KHz. This method is misleading to the consumer and incompatible with ANSI standard sample rates;

2. Blocking the audio data into unequal blocks of audio and phase locking that audio sample rate to the video sample rate, i.e., digital video tape recorders format data into a 5 frame (10 field) sequence using multiple, unequal audio blocks of 160 and 161 samples, which requires a separate linear control track containing the frame sequence and is sub-optimal for field based disk recording (Watkinson, "The Art of Digital Audio", ISBN 0 240 5 1270 7, Focal Press 1988, pgs. 393–394);

3. Resampling using interpolation/decimation, and/or polyphase sample rate conversion, combined with phase locked loops, and/or sample buffers (Watkinson supra, pg. 546); and 4. "Stutter skip" synchronization, per the above-mentioned patent application, which relies upon "sample stuffing" using excess channel bandwidth and phase locked loops to control frequency drift.

What is desired is a method for direct synthesis of a digital audio sample clock for recording digital audio sampled at any frequency, including ANSI S4.28–1984 (AESS) and MPC (Microsoft Press "Multimedia PC Specification Version 1.0 1992), together with digital video sampled at 525/60 and 625/50 CCIR frequencies (ANSI S4.40–1992 (AES3)).

SUMMARY OF THE INVENTION

Accordingly the present invention provides for direct synthesis of a digital audio sample clock based upon any standard digital video sample frequency for video time scale accurate audio recording without using phase locked loops. A numerically controlled oscillator (NCO) is directly driven from a video clock to generate the digital audio sample clock. A phase accumulator accumulates a phase increment $K_c$ at the digital video sample frequency rate $f_v$. The output from the phase accumlator accesses a lookup table to provide a digital sine wave. The digital sine wave is converted to an analog sine wave signal from which the digital audio sample clock is derived. A slight phase and frequency imprecision ($½^{Bp}$) is allowed that is dependent on the error or bit-precision of the phase accumulation, which accumulation may be extended to any bit-length to minimize the error to acceptable levels.

The objects, advantages and other novel features of the present invention are apparent from the following detailed description when read in conjunction with the appended claims and attached drawing.

BRIEF DESCRIPTION OF THE DRAWING

The FIGURE is a block diagram view of a circuit for performing direct synthesis of a digital audio sample clock according to the present invention.

DESCRIPTION OF THE PREFERRED EMBODIMENT

The relationship between a video clock and an audio clock is described by the equation:

$$f_a = f_v * K_c / 2^{Bp}$$

where $f_a$ is the audio sampling clock frequency, $f_v$ is the video sampling clock frequency, $K_c$ is a phase increment per video clock cycle (a signed integer less than $2^{Bp}$) and $B_p$ is the bit precision of a phase accumulator in a numerically controlled oscillator (NCO). As shown the relationship between the audio and video sampling clock frequencies is linear so that any variation in the frequency of $f_v$ is transferred proportionally to $f_a$, effecting a video clock to audio clock frequency lock to a precision in Hertz of the fraction $f_v/2^{Bp}$. For a 27 MHz video clock, an 11.2896 MHz target audio clock (corresponding to 256*44.1 KHz) and a 32-bit precision NCO, the resulting error is $6.29 \times 10^{-3}$ Hz, which corresponds to $2.46 \times 10^{-5}$ Hz error at the 44.1 KHz true audio sampling rate. The audio sampling clock therefore takes 11 hours to accumulate one sample of error. In terms of lip-sync a 10 ms audio-to-video error takes 207 days to occur, far longer than any imaginable video production.

Referring now to the FIGURE a phase accumulator 12 has as one input the phase increment $K_c$. The output from the phase accumulator 12 is fed back to a second input for accumulation with $K_c$. The phase accumulator 12 is clocked by $f_v$ so that accumulation of phase information is continuously generated at the video clock rate. The phase output from the phase accumulator 12 is input to a sine/cosine lookup table (LUT) 14 which generates a digital sine wave at an output. The phase accumulator 12 and the LUT 14 may be integrated into an HSP45102 integrated circuit manufactured by Harris Corporation.

The digital sine wave is input to a digital to analog converter (DAC) 16. The analog sine wave output from the DAC 16 is input to a lowpass filter 18 that filters out conversion harmonics generated by the DAC, leaving a pure sine wave. The sine wave at the audio clock frequency is then input to a comparator/level-shifter 20 which converts the sine wave to a square wave to form the final output audio clock $f_a$.

Thus the present invention provides for direct synthesis of a digital audio clock signal based upon any standard digital video sample frequency for video time scale accurate audio recording without using a phase locked loop by using a numerically controlled oscillator directly driven by the video sample frequency.

What is claimed is:

1. A circuit for direct synthesis of a digital audio sample clock from a video sample clock comprising:

means for accumulating a phase increment at the video sample clock frequency rate to produce a phase output;

means for generating an analog sine wave signal at a frequency for the digital audio sample clock from the phase output; and means for converting the analog sine wave signal to the digital audio sample clock.

2. The circuit as recited in claim 1 wherein the accumulating means comprises a phase accumulator having the phase increment as one input and the phase output fed back at a second input for incrementing by the phase increment, and having a clock input to which a video sample clock is applied to continuously update the phase output at the video sample clock frequency rate.

3. The circuit as recited in claim 1 wherein the generating step comprises:

a sine lookup table accessed by the phase output to produce a digital sine wave; and means for converting the digital sine wave to the analog sine wave signal.

4. A method of direct synthesis of a digital audio sample clock from a digital video sample clock comprising the steps of:

accumulating a phase increment at the frequency rate of the digital video sample clock to produce a phase output signal, the phase increment being determined according to the equation $$f_a = f_v {}^* K_c / 2^{B_p}$$

where $f_a$ is a desired frequency of the digital audio sample clock, $f_v$ is the frequency of the digital video sample clock, $K_c$ is the phase increment and $B_p$ is a bit precision of the accumulating step;

generating from the phase output signal a sine wave signal having a frequency equal to the desired frequency of the digital audio sample clock; and converting the sine wave signal to the digital audio sample clock.

* * * * *